Aug. 14, 1928.                               1,681,080
S. J. BAILEY
SANITARY MILK BOTTLE CONTAINER
Filed Aug. 12, 1927
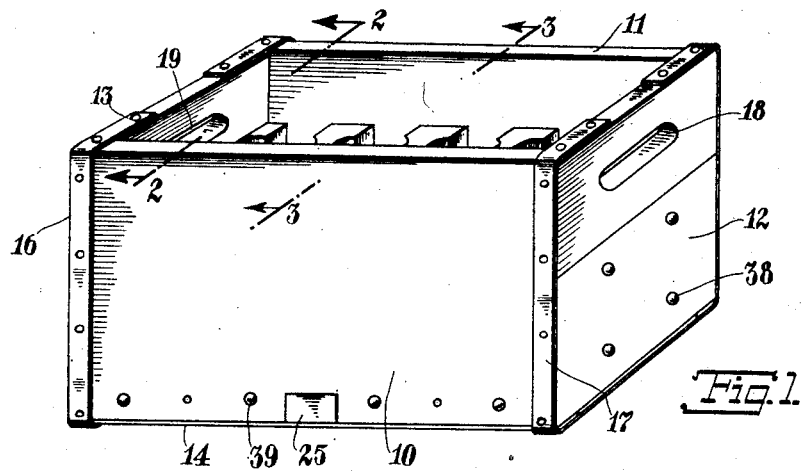
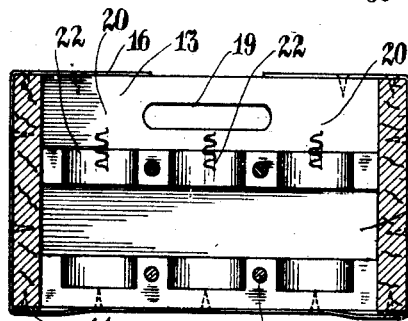
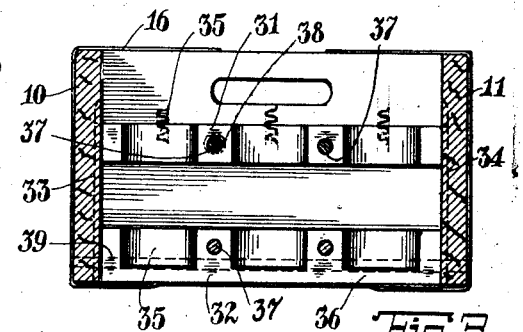
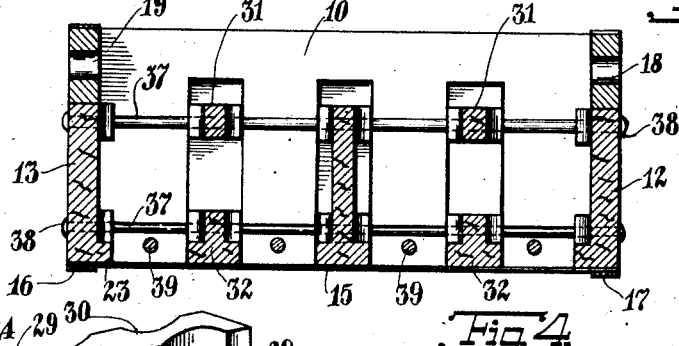
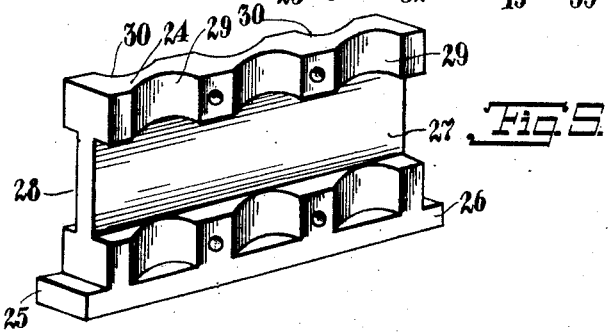
INVENTOR
Samuel J. Bailey
BY
ATTORNEY Patented Aug. 14, 1928.

1,681,080

UNITED STATES PATENT OFFICE.

SAMUEL J. BAILEY, OF NICHOLSON, PENNSYLVANIA.

SANITARY MILK-BOTTLE CONTAINER.

Application filed August 12, 1927. Serial No. 212,444.

This invention relates to improvements in crates for holding and transporting milk bottles, and is especially adapted for holding the milk bottles separately from each other so as to prevent breakage in handling.

The object of the invention is to provide a crate of the class described of sanitary construction.

A further object of the invention is to provide a crate of novel construction and arrangement of parts hereinafter more fully described, claimed and illustrated in the accompanying drawing.

Fig. 1 is a perspective view of my improved crate.

Fig. 2 is a transverse sectional view taken on the line 2—2 of Fig. 1.

Fig. 3 is a similar sectional view taken on the line 3—3 of Fig. 1.

Fig. 4 is a longitudinal central sectional view thereof.

Fig. 5 is a perspective detail view of the center member.

As here embodied my improved crate comprises side members 10 and 11, and end members 12 and 13, secured together at the corners to form a substantial rectangular frame open at the top and bottom. The above mentioned frame is reinforced by the longitudinal strips 14 and 15, secured to the bottom of the side members 10 and 11, and by means of the strips 16 and 17, secured to the corners of the said frame, and extending somewhat adjacent to the upper center portion of the end members 12 and 13, around the said end members over the extremities of the side members 12 and 13. The said end members 12 and 13 have formed therein elongated slots 18 and 19, respectively, adapted to provide suitable means of handling my improved crate.

The end members, 12 and 13 comprise separate members namely upper and lower jointed as at 20 by the usual corrugated attaching means. The said lower members have formed therein a longitudinal central slot 21 for storing refrigerants and a plurality of transverse curved openings 22. The said lower members of the end members 12 and 13 have lower extended portions 23, upon which the bottom of the said milk bottles rest. I have also provided a solid one-piece center member 24, provided with lower side extended portions 25 and 26, engaged in apertures formed in the side members 10 and 11. The said center member has formed therein longitudinal central slots 27 and 28 for storing refrigerants, and a plurality of transverse curved openings 29 and 30 at both sides thereof.

I have also provided upper and lower transverse members 31 and 32, adapted to slidably engage in elongated openings 33 and 34, formed in the side members 10 and 11. The said upper and lower transverse members have formed therein a plurality of transverse curved openings 35. The lower transverse members 32 are provided with lower extended portions 36 upon which the bottoms of the said milk bottles rest.

The rods 37 extend longitudinally of the said crate, and are riveted, as at 38 to the side end members 12 and 13, so as to hold the center member and the said transverse members in place. Similar rods 39 extend transversely, so as to securely hold the said side members in place and upon which the bottoms of the said milk bottles also rest.

Bottles of milk placed into the container may be kept in good condition by refrigerants forced around the bottles into the space formed by the longitudinal slots, and also other available spaces.

Having thus described my invention, what I claim as new and desire to protect by Letters Patent of the United States is as follows:

In a container for bottles and the like, sides and ends for the container, a series of transverse partitions relative to the sides, the said ends and the said partitions being formed with transverse curved recesses for accommodating bottles, and also with longitudinal slots for forming chambers for the storing of refrigerants.

In testimony whereof I have affixed my signature.

SAMUEL J. BAILEY.